United States Patent
Choi et al.

(10) Patent No.: US 11,320,948 B2
(45) Date of Patent: May 3, 2022

(54) FILM TOUCH SENSOR AND METHOD FOR FABRICATING THE SAME

(71) Applicant: DONGWOO FINE-CHEM CO., LTD., Jeollabuk-do (KR)

(72) Inventors: Yong-Seok Choi, Gyeonggi-do (KR); Seung Kook Kim, Seoul (KR); Jong Hee Kim, Gyeonggi-do (KR); Min Seok Seo, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 71 days.

(21) Appl. No.: 15/933,603

(22) Filed: Mar. 23, 2018

(65) Prior Publication Data
US 2018/0210584 A1  Jul. 26, 2018

Related U.S. Application Data

(63) Continuation of application No. PCT/KR2016/010510, filed on Sep. 21, 2016.

(30) Foreign Application Priority Data

Sep. 25, 2015 (KR) .................. 10-2015-0136146

(51) Int. Cl.
*G06F 3/041* (2006.01)
*G06F 3/044* (2006.01)
*G06F 3/047* (2006.01)

(52) U.S. Cl.
CPC ............ *G06F 3/0446* (2019.05); *G06F 3/047* (2013.01); *G06F 3/0412* (2013.01); *G06F 2203/04103* (2013.01); *G06F 2203/04113* (2013.01)

(58) Field of Classification Search
CPC ............................................. G06F 2203/04103
See application file for complete search history.

(56) References Cited

U.S. PATENT DOCUMENTS 10,862,105 B2 * 12/2020 Gronwald ......... H01M 10/0585
2006/0063351 A1 * 3/2006 Jain .................. G02F 1/1362
                                                                 438/455

(Continued)

FOREIGN PATENT DOCUMENTS

CN     103247365 A     8/2013
CN     103472940 A     12/2013

(Continued)

OTHER PUBLICATIONS

International Search Report for PCT/KR2016/010510, dated Dec. 20, 2016.
Office action dated Sep. 2, 2020 from China Patent Office in a counterpart China Patent Application No. CN 201680055097.3 (all the cited references are listed in this IDS.) (English translation is also submitted herewith.).

(Continued)

*Primary Examiner* — William Boddie
*Assistant Examiner* — Bipin Gyawali
(74) *Attorney, Agent, or Firm* — The PL Law Group, PLLC

(57) ABSTRACT

A film touch sensor in which a conductive pattern layer and a separation layer are sequentially disposed, and a base film is disposed on at least one surface of the conductive pattern layer and the separation layer, includes a capping layer which is disposed between the separation layer and the conductive pattern layer and includes $SiO_xN_y$ ($0 \leq x \leq 4$, $y=4-x$), thereby it is possible to improve visibility of an image and reduce a resistance of the conductive pattern layer, and a method for fabricating the same.

17 Claims, 2 Drawing Sheets

(56) References Cited

U.S. PATENT DOCUMENTS

| | | | | |
|---|---|---|---|---|
| 2007/0134459 A1* | 6/2007 | Hubert | ................... | G02B 1/105 |
| | | | | 428/40.1 |
| 2008/0042168 A1* | 2/2008 | Watanabe | ........... | B32B 37/0053 |
| | | | | 257/204 |
| 2012/0075207 A1* | 3/2012 | Jang | ........................ | G06F 3/044 |
| | | | | 345/173 |
| 2014/0272565 A1* | 9/2014 | Gronwald | ........... | H01M 10/052 |
| | | | | 429/211 |
| 2014/0272594 A1* | 9/2014 | Safont Sempere | ... | H01M 4/134 |
| | | | | 429/231.95 |
| 2015/0022739 A1* | 1/2015 | Chen | ..................... | G06F 1/1643 |
| | | | | 349/12 |
| 2015/0255518 A1* | 9/2015 | Watanabe | ........... | H01L 27/1225 |
| | | | | 257/43 |
| 2016/0004344 A1* | 1/2016 | Lee | ........................ | G06F 3/044 |
| | | | | 216/13 |
| 2016/0170540 A1* | 6/2016 | Yang | ........................ | G02B 1/14 |
| | | | | 345/173 |
| 2016/0306474 A1* | 10/2016 | Cho | ........................ | G06F 3/047 |
| 2017/0139256 A1* | 5/2017 | Yu | ..................... | G02F 1/136286 |

FOREIGN PATENT DOCUMENTS

| | | |
|---|---|---|
| CN | 104376898 A | 2/2015 |
| KR | 10-2010-0070730 A | 6/2010 |
| KR | 10-2011-0061317 A | 6/2011 |
| KR | 10-1191865 B1 | 10/2012 |
| KR | 10-2014-0025039 A | 3/2014 |
| KR | 10-2014-0114261 A | 9/2014 |
| TW | 201443742 A | 11/2014 |

\* cited by examiner

FILM TOUCH SENSOR AND METHOD FOR FABRICATING THE SAME

CROSS REFERENCE TO RELATED APPLICATIONS AND CLAIM OF PRIORITY

The present application is a continuation application to International Application No. PCT/KR2016/010510 with an International Filing Date of Sep. 21, 2016, which claims the benefit of Korean Patent Application Nos. 10-2015-0136146 filed on Sep. 25, 2015 at the Korean Intellectual Property Office, the disclosures of which are incorporated by reference herein in their entirety.

BACKGROUND

1. Field

The present invention relates to a film touch sensor and a method for fabricating the same.

2. Description of the Related Art

Attempts are being made to introduce a touch input type into various electronic devices as the touch input type becomes spotlighted as a next-generation input type. Accordingly, research and development of a touch sensor capable of being applied to different environments and accurately recognizing a touch have been actively executed. For example, in a case of the electronic device having a touch input type display, an ultra-thin flexible display which achieves an ultra-light weight and a low power consumption with improved portability is in the spotlight as a next-generation display, and thus the development for a touch sensor applicable to such a display is required.

The flexible display refers to a display fabricated on a flexible substrate which is capable of being bent, folded, or warped without a reduction in operational characteristics, and techniques thereof have been developed in fabricating flexible LCDs, flexible OLEDs, electronic papers, and the like.

In order to apply the touch input type to such the flexible display, a touch sensor having excellent bendability and restoring force, as well as superior flexibility and elasticity is required.

In regard to a film touch sensor for fabricating the flexible display, a wiring substrate including wirings buried in a transparent resin base film has been proposed.

A method for fabricating a film touch sensor includes: a wiring formation process of forming metal wirings on a carrier substrate, a lamination process of applying a transparent resin solution to the carrier substrate and drying so as to cover the metal wirings, thus to form a transparent resin base film, and a peeling-off process of peeling-off the transparent resin base film from the carrier substrate.

In order to easily perform the peeling-off process, the above-described fabrication method includes a method in which an organic peeling-off agent such as a silicone resin or a fluorine resin; or an inorganic peeling-off agent such as a diamond-like carbon (DLC) thin film or a zirconium oxide thin film is formed on a surface of the substrate in advance.

However, in a case of using the inorganic peeling-off agent, when peeling-off the base film and the metal wirings from the carrier substrate, the base film and the metal wirings are not smoothly peeled-off therefrom, such that a portion of the base film or the metal wirings remains on the carrier substrate, and an organic material used as the peeling-off agent comes out on the surfaces of the base film and metal wirings.

That is, even though the peeling-off agent is used, the metal wiring of the wiring substrate may not be completely peeled off from the substrate.

To solve the above-described problem, Korean Patent Registration No. 10-1191865 discloses a method which includes: forming a sacrifice layer capable of being removed by light or a solvent, a metal wiring, and a polymer material (flexible substrate) on a substrate during the fabrication of the flexible substrate in which the metal wiring is buried; and then removing the sacrifice layer using the light or the solvent to peel off the metal wiring and the polymer material (flexible substrate) from the substrate.

However, the above-described method may not be applied to a large-size and a high-temperature display process, and thus various film bases may not be used.

SUMMARY

Accordingly, it is an aspect of the present invention to provide a film touch sensor with improved visibility of an image.

In addition, another aspect of the present invention is to provide a film touch sensor having conductive patterns of a low resistance.

Further, another aspect of the present invention is to provide a film touch sensor capable of easily forming a pattern layer, or the like by performing a process on a carrier substrate, and a method for fabricating the same.

The above aspects of the present invention will be achieved by the following characteristics:

(1) A film touch sensor in which a conductive pattern layer and a separation layer are sequentially disposed comprises a base film disposed on at least one surface of the conductive pattern layer or the separation layer, and a capping layer interposed between the separation layer and the conductive pattern layer, the capping layer including $SiO_xN_y$ ($0 \leq x \leq 4$, $y=4-x$).

(2) In the film touch sensor according to above (1), in the $SiO_xN_y$, x and y may have a relation of $0<x<4$ and $y=4-x$.

(3) In the film touch sensor according to above (1), the separation layer may be formed of a polymer selected from a group consisting of polyimide-based polymer, polyvinyl alcohol-based polymer, polyamic acid-based polymer, polyamide-based polymer, polyethylene-based polymer, polystyrene-based polymer, polynorbornene-based polymer, phenyl maleimide copolymer, polyazobenzene-based polymer, polyphenylene phthalamide-based polymer, polyester-based polymer, polymethyl methacrylate-based polymer, coumarin-based polymer, phthalimidine-based polymer, chalcone-based polymer and aromatic acetylene-based polymer.

(4) In the film touch sensor according to above (1), the film touch sensor may further include a first protective layer interposed between the separation layer and the capping layer.

(5) In the film touch sensor according to above (1), the conductive pattern layer may be formed of at least one material selected from a group consisting of a metal oxide, a metal, a metal nanowire, a carbon-based material, and a conductive polymer.

(6) In the film touch sensor according to above (1), the conductive pattern layer may be formed of indium tin oxide (ITO).

(7) In the film touch sensor according to above (1), the conductive pattern layer may have a thickness ranging from about 100 to 500 Å.

(8) In the film touch sensor according to above (1), the film touch sensor may further include a second protective layer disposed on the capping layer on which the conductive pattern layer is formed.

(9) In the film touch sensor according to above (1), the base film may be a polarizer or a transparent film.

(10) A touch panel comprising the film touch sensor according to any one of above (1) to (9).

(11) An image display device comprising the touch panel according to above (10).

(12) A method for fabricating a film touch sensor, comprising: forming a separation layer on a carrier substrate, forming a capping layer including $SiO_xN_y$ (0≤x≤4, y=4−x) on the separation layer, forming a conductive pattern layer on the capping layer, and peeling-off the carrier substrate from the separation layer.

(13) The method according to above (12), further comprising adhering a base film to the conductive pattern layer.

(14) The method according to above (12), further comprising adhering a base film to a surface of the separation layer from which the carrier substrate is peeled-off.

(15) In the method according to above (12), in the $SiO_xN_y$, x and y may have a relation of 0<x<4 and y=4−x.

(16) In the method according to above (12), the capping layer may be formed by a deposition method.

(17) The method according to above (12), further comprising forming a first protective layer on the separation layer before forming the capping layer.

(18) The method according to above (12), further comprising forming a second protective layer on the capping layer on which the conductive pattern layer is formed.

(19) The method according to above (12), further comprising adhering a base film to the conductive pattern layer or the separation layer using an adhesive agent.

The film touch sensor of present invention is provided with the capping layer including at least one of silicon oxynitride, silicon nitride and silicon oxide on one side of the conductive pattern layer, such that visibility of the touch patterns may be improved.

In addition, the film touch sensor of present invention is provided with the above capping layer, such that a conductive pattern layer of a low resistance may be achieved by increasing crystallinity of the conductive pattern layer including ITO.

Furthermore, according to the present invention, it is possible to prevent a thermal damage of the base film, or the like by performing the process of forming the pattern layer of the film touch sensor on the carrier substrate, and then attaching the base film thereto.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTIONS

Example embodiments of the present invention provide a film touch sensor, in which a conductive pattern layer and a separation layer are sequentially disposed, and a base film is disposed on at least one surface of the conductive pattern layer and the separation layer, including a capping layer which is disposed between the separation layer and the conductive pattern layer and which includes $SiO_xN_y$ (0≤x≤4, y=4−x). Thus, visibility of an image may be improved, and a resistance of the conductive pattern layer may be reduced in the film touch sensor, and a method for fabricating the same is also provided.

Hereinafter, example embodiments of the present invention will be described in detail with reference to the accompanying drawings. However, since the drawings attached to the present disclosure are only given for illustrating one of various exemplary embodiments of present invention to easily understand the technical spirit of the present invention, it should not be construed as limiting the present inventive concepts.

Film Touch Sensor

Figure 1:
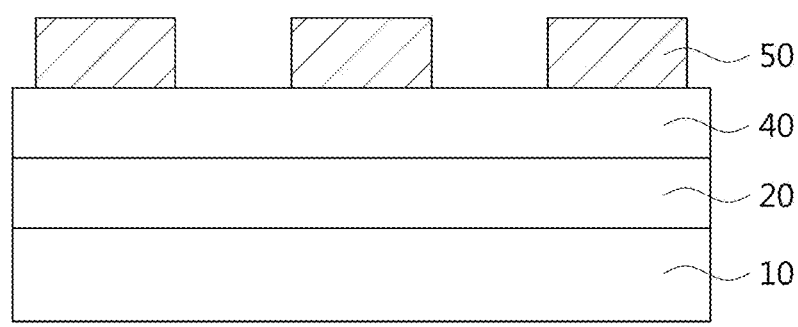
FIG. 1 is a cross-sectional view schematically illustrating a film touch sensor before being separated from a carrier substrate according to one embodiment of the present invention.

FIG. 1 is a cross-sectional view schematically illustrating a film touch sensor according to one embodiment of the present invention before being separated from a carrier substrate.

The film touch sensor according to one embodiment of the present invention includes a carrier substrate 10, a separation layer 20 which is a layer for separation from the carrier substrate 10, and a conductive pattern layer 50. The separation layer 20 serves as a layer for covering and protecting the conductive pattern layer 50, and a layer for insulation from other layers.

Accordingly, the separation layer 20 may be easily peeled-off from the carrier substrate 10, and, for example, is formed of a material which is not peeled-off from a capping layer 40 or a first protective layer 30, which will be described below. In this aspect, the separation layer 20 may be a polymer organic film, and may be formed of, for example, a polymer such as polyimide polymer, polyvinyl alcohol polymer, polyamic acid polymer, polyamide polymer, polyethylene polymer, polystyrene polymer, polynorbornene polymer, phenyl maleimide copolymer, polyazobenzene polymer, polyphenylene phthalamide polymer, polyester polymer, polymethyl methacrylate polymer, polyarylate polymer, cinnamate polymer, coumarin polymer, phthalimidine polymer, chalcone polymer, aromatic acetylene polymer, or the like, but it is not limited thereto. These compounds may be used alone or in combination of two or more thereof.

The carrier substrate 10 may be formed of any material without particular limitation so long as it provides a proper strength substantially without being affected by heat and chemical treatments, so that the substrate may not be easily bent or distorted and may be fixed during a processing. For example, glass, quartz, silicon wafer, SUS, etc. may be used, and glass may be used.

The capping layer 40 is a layer including at least one (SiOxNy) of silicon oxynitride, silicon nitride or silicon oxide, and may decrease visibility of the conductive pattern layer 50 by adjusting a refractive index difference between the conductive pattern layer 50 and other layers. Therefore, when coupled to an image display device, the capping layer 40 may improve visibility of an image. In addition, when the conductive pattern layer 50 is formed of a conductive metal oxide, for example, indium tin oxide (ITO), an active energy required for crystallization thereof may be reduced to activate the crystallization at a lower annealing temperature, and thus a low resistance in the conductive pattern layer may be realized. Such the low resistance in the conductive pattern layer may induce an improvement of sensitivity of a touch signal.

The capping layer 40 including SiOxNy (0≤x≤4, y=4−x) according to embodiments of the present invention may be a layer including at least one of silicon oxynitride, silicon nitride or silicon oxide. When the layer is the silicon oxide (y=0), effects of improving the visibility may become greater, and when the layer is the silicon oxynitride (0<x<4, y=4−x), effects of reducing the resistance of the conductive pattern layer 50 may become greater.

The layer including SiOxNy may be formed by a method known in the related art, and may be formed by a deposition method, for example.

The conductive pattern layer 50 may include sensing electrodes and pad electrodes for sensing a touch.

The sensing electrodes and the pad electrodes may be located in a sensing area and a pad area on the separation layer, respectively. However, since it is necessary for the sensing electrodes and the pad electrodes to be electrically connected with each other, at least a part of the sensing electrodes may be located in the pad area, and at least a part of the pad electrodes may be located in the sensing area.

Herein, the sensing area refers to an area corresponding to a display portion on which the touch is applied in the film touch sensor, and the pad area refers to an area corresponding to a pad portion. That is, the sensing area on the separation layer refers to an area corresponding to the display portion on the separation layer, and the pad area refers to an area corresponding to the pad portion on the separation layer.

The conductive pattern layer 50 may include any material without particular limitation thereof so long as it is a conductive material. For example, the conductive pattern layer 50 may be formed of a material selected from a metal oxide selected from a group consisting of indium tin oxide (ITO), indium zinc oxide (IZO), indium zinc tin oxide (IZTO), aluminum zinc oxide (AZO), gallium zinc oxide (GZO), fluorine tin oxide (PTO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO) and aluminum zinc oxide-silver-aluminum zinc oxide (AZO-Ag-AZO); a metal selected from a group consisting of gold (Au), silver (Ag), copper (Cu), molybdenum (Mo) and APC; a metal nanowire selected from a group consisting of gold, silver, copper and lead; a carbon-based material selected from a group consisting of carbon nanotube (CNT) and graphene; and a conductive polymer material selected from a group consisting of poly(3,4-ethylenedioxythiophene) (PEDOT) and polyaniline (PANI). These compounds may be used alone or in combination of two or more thereof, and, for example, the indium tin oxide may be used. Further, both of crystalline indium tin oxide and non-crystalline indium tin oxide may be used.

A thickness of the conductive pattern layer 50 is not particularly limited, but a thin film may be used as much as possible in consideration of flexibility of the film touch sensor. For example, the conductive pattern layer 50 may have a thickness of about 100 to 500 Å. Meanwhile, as the conductive pattern 50 becomes thinner, the resistance may increase. However, since the film touch sensor of the present invention includes the above-described capping layer 40, it is possible to maintain excellent sensitivity by preventing the increase of resistance.

Unit patterns of the conductive pattern layer 50 may be each independently a polygonal pattern such as a triangle, quadrangle, pentagon, hexagon, or heptagon or more.

In addition, the conductive pattern layer 50 may include regular patterns. The regular pattern means that a form of the patterns has regularity. For example, the unit patterns may each independently include, e.g., a mesh pattern such as a rectangle or square, or a hexagonal pattern.

Further, the conductive pattern layer 50 may include irregular patterns. The irregular pattern means that the form of the patterns has no regularity.

When the conductive pattern layer 50 is formed of a material such as metal nanowires, carbon-based materials, polymer materials, and the like, the conductive pattern layer 50 may have a network structure.

When the conductive pattern layer 50 has the network structure, since a signal may be sequentially transferred to adjacent patterns in contact with each other, patterns having high sensitivity may be obtained.

The conductive pattern layer 50 may be formed in a single layer or a plurality of layers. For example, when forming the electrodes in two directions which are different from each other in order to sense a touch position, the conductive pattern layer 50 may be formed in two layers for insulating the electrodes in different directions from each other. When the conductive pattern layer 50 is formed in a single layer, the electrodes arranged in any one direction may be electrically connected with each other through bridge electrodes while maintaining an electrical insulation from the electrodes arranged in the other direction.

Figure 2:
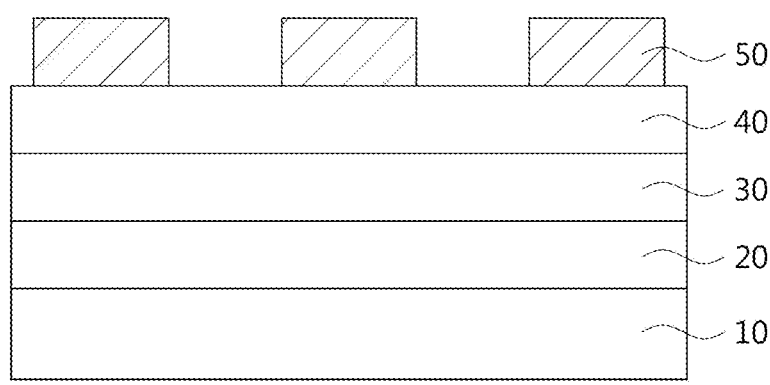
FIG. 2 is a cross-sectional view schematically illustrating a film touch sensor before being separated from a carrier substrate according to another embodiment of the present invention.

According to an embodiment of the present invention, the film touch sensor may optionally further include the first protective layer 30 disposed between the separation layer 20 and the capping layer 40. FIG. 2 schematically illustrates an example of the film touch sensor including the first protective layer 30.

The first protective layer 30 may also cover the conductive pattern layer 50 similarly to the separation layer 20 to protect the conductive pattern layer 50, and may prevent the separation layer 20 from being exposed to an etchant for forming the conductive pattern layer 50 during a fabricating process of the film touch sensor of the present invention.

Polymers known in the related art may be used for the first protective layer 30 without particular limitation thereof, and the first protective layer 30 may be formed of an organic insulation layer, for example.

The first protective layer 30 may cover at least a portion of a side of separation layer 20 so as to minimize the side of the separation layer 20 from being exposed to the etchant during a process such as patterning of the conductive patterns. The first protective layer 30 may cover the entire side of the separation layer 20 for completely shielding the side of the separation layer 20.

Figure 3:
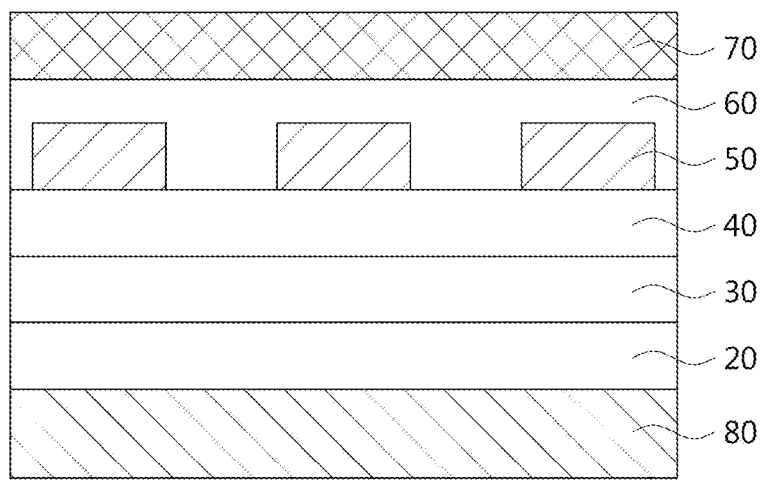
FIG. 3 is a cross-sectional view schematically illustrating the film touch sensor separated from a carrier substrate according to one embodiment of the present invention.

As illustrated in FIG. 3, the film touch sensor of the present invention may further include a second protective layer 60 located on the capping layer 40 on which the conductive pattern layer 50 is formed.

The second protective layer 60 may serve as a base film and a passivation layer. In addition, the second protective layer 60 may prevent the conductive pattern layer 50 from being corroded, and may serve as a planarizing layer to suppress an occurrence of microbubbles when being attached to a base film 70. The second protective layer 60 may serve as an adhesive layer.

When the second protective layer 60 serves as the base film or the passivation layer, it may be formed of a silicon-based polymer such as polydimethylsiloxane (PDMS), polyorganosiloxane (POS), etc.; a polyimide-based polymer; a polyurethane-based polymers, or the like, but it is not limited thereto. These may be used alone or in combination of two or more thereof.

When the second protective layer 60 serves as the adhesive layer, any thermosetting or photo-curable adhesive, or binder known in the related art may be used without particular limitation thereof. For example, polyester, polyether, urethane, epoxy, silicone, acrylic adhesive or binder, etc., may be used.

As illustrated in FIG. 3, the film touch sensor of the present invention may further include the base film 70 adhered on the second protective layer 60.

When the second protective layer 60 is the adhesive layer, the base film 70 may be directly adhered on the second protective layer 60. Alternatively, the base film 70 may be adhered through an adhesive layer on the second protective layer 60.

According to an embodiment of the present invention, the base film 70 may be adhered toward the separation layer 20. In this case, after the separation layer 20 is separated from the carrier substrate 10, the base film 70 may be adhered to a surface of the separation layer 20 from which the carrier substrate 10 is peeled-off.

As the base film 70, a transparent film including the material widely used in the related art may be used without particular limitation thereof. For example, the base film 70 may be a film including any one selected from a group consisting of cellulose ester (e.g. cellulose triacetate, cellulose propionate, cellulose butyrate, cellulose acetate propionate, and nitrocellulose), polyimide, polycarbonate, polyester (e.g. polyethylene terephthalate, polyethylene naphthalate, poly-1,4-cyclohexanedimethyleneterephthalate, polyethylene 1,2-diphenoxyethane-4,4'-dicarboxylate and polybutylene terephthalate, polystyrene (e.g. syndiotactic polystyrene), polyolefin (e.g. polypropylene, polyethylene, and polymethyl pentene), polysulfone, polyether sulfone, poly arylate, polyether-imide, polymethyl methacrylate, polyether ketone, polyvinyl alcohol, and polyvinylchloride, or a mixture thereof, which may be used alone or in combination of two or more thereof.

Further, the transparent film may be an isotropic film or a retardation film.

When the transparent film is the isotropic film, an in-plane retardation (Ro, Ro=[nx−ny]×d], nx and ny represent a main refractive index of a film plane (in-plan refractive index), nz represents a refractive index in a thickness direction of the film, and d represents a thickness of the film) is 40 nm or less, for example, 15 nm or less, and a retardation in a thickness direction ($R_{th}$, $R_{th}$=[(nx+ny)/2−nz]×d) ranges from −90 nm to +75 nm, particularly, −80 nm to +60 nm, and more particularly, −70 nm to +45 nm.

The retardation film may be a film fabricated by processes including mono-axial stretching or biaxial stretching of a polymer film, polymer coating, and liquid crystal coating, and may be generally used to enhance and control optical characteristics such as compensation for a viewing angle, enhancement of color sensitivity, enhancement of light leakage, control of a color taste in a display.

A polarizer may also be used as the base film 70.

The polarizer may be a type in which a polarizer protective film is attached to one surface or both surfaces of a polyvinyl alcohol polarizer.

A protective film may also be used as the base film 70.

The protective film may be a film in which an adhesive layer is foiled on at least one surface of a film formed of a polymer resin or a film having a self-adhesion property such as polypropylene, and may be used to protect a surface of the film touch sensor and enhance workability.

For example, the base film 70 may have a light transmittance of 85% or more, and preferably 90% or more. Further, the base film 70 may have a total Haze value of 10% or less, and, for example, 7% or less, which is measured by JIS K7136.

A thickness of the base film 70 is not limited, but may be about 30 to 150 μm, and, for example, about 70 to 120 μm.

During the fabricating process of the film touch sensor of the present invention, the carrier substrate 10 is separated from the bottom of the separation layer 20, and a second base film 80 may be adhered to the area from which the carrier substrate 10 is separated. The second base film 80 may include a film substantially the same or similar to the base film 70.

As described above, when the base film 70 is adhered to the separation layer 20 side, the second base film 80 may be adhered on the second protective layer 60.

The film touch sensor of the present invention having the above-described configuration may be peeled-off from the carrier substrate 10, and then may be used as a film touch sensor.

A Method for Fabricating a Film Touch Sensor

In addition, the present invention provides a method for fabricating a film touch sensor.

The method for fabricating a film touch sensor according to one embodiment of the present invention may include: forming a separation layer on a carrier substrate; forming a capping layer including SiOxNy (0≤x≤4, y=4−x) on the separation layer; forming a conductive pattern layer on the capping layer; and adhering a base film to the conductive pattern layer.

The method for fabricating a film touch sensor according to another embodiment of the present invention may include: forming a separation layer on a carrier substrate; forming a capping layer including SiOxNy (0≤x≤4, y=4−x) on the separation layer; forming a conductive pattern layer on the capping layer; and peeling-off the separation layer from the carrier substrate and adhering a base film to a surface of the separation layer from which the carrier substrate is peeled-off.

Hereinafter, the method for fabricating a film touch sensor according to one embodiment of the present invention will be described in detail.

According to one embodiment of the method for fabricating a film touch sensor of the present invention, the separation layer 20 is formed on the carrier substrate 10.

The carrier substrate 10 may include any material without particular limitation thereof, so long as it can provide a proper strength without being affected by heat and chemical treatments, so that the substrate may not be easily bent or distorted during processing. For example, glass, quartz, silicon wafer, SUS, etc. may be used, and glass may be used. The separation layer 20 may be formed of the above-described polymer material.

Since the separation layer 20 may be easily peeled-off from the carrier substrate 10, a damage of the electrode pattern layer may be avoided due to a decreased impact applied to the touch sensor during peeling-off from the carrier substrate.

A method for forming the separation layer 20 is not particularly limited, but the separation layer 20 may be formed by applying the above-described polymer material using any conventional method known in the related art such as slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

After forming the separation layer 20 by the above-described method, a curing process may be further executed thereon.

The curing method of the separation layer 20 is not particularly limited but may include photo-curing, thermosetting or both of these processes. In a case of executing both of the photo-curing and the thermosetting processes, a process order is not particularly limited.

Particular example of curing conditions, the thermosetting may be executed at about 50 to 300° C. for 1 minute to 60 minutes, and preferably, about 100 to 200° C. for 5 minutes to 30 minutes. The photo-curing may be executed by irradiating the separation layer 20 with UV rays having an intensity of about 0.01 to 10 J/cm$^2$ for 1 second to 500 seconds, and preferably, UV rays having an intensity of about 0.05 to 1 J/cm$^2$ for 1 second to 120 seconds, but it is not limited thereto.

Next, the capping layer 40 including SiOxNy (0≤x≤4, y=4−x) is formed on the separation layer 20.

The capping layer 40 may be formed through a deposition method, and for example, may be formed by a chemical vapor deposition, or a physical vapor deposition. A ratio (x and y) of oxygen (O) and nitrogen (N) may be modified by adjusting a ratio of a source material in the deposition method.

According to an embodiment of the present invention, if necessary, the inventive method may further include forming the first protective layer 30 on the separation layer 20 before forming the capping layer 40. In this case, the capping layer 40 may be formed on the first protective layer 30.

The first protective layer 30 may be formed of, for example, a composition for forming a first protective layer including: acryl copolymer, poly-functional acryl monomer, a photo-initiator, a curing enhancer, a solvent, of the like. A method for forming the first protective layer 30 is not particularly limited and may include the same method as the method for forming the separation layer 20.

The first protective layer 30 may be formed of a material which may not be deteriorated during a process such as pattering of the patterns to be described below, so that a defect rate may be significantly reduced when the film touch sensor is actually applied to products.

Then, the conductive pattern layer 50 is formed on the capping layer 40.

Forming of the conductive pattern layer 50 may be executed by applying a conductive compound to the capping layer 40 to form a film, and thermally treating the same at about 200 to 300° C. for 10 to 40 minutes. In this case, the conductive pattern layer may be formed to have a final thickness of about 100 to 500 Å.

Forming of the conductive pattern layer 50 may be performed using a conductive compound including, e.g., indium tin oxide (ITO) so as to have a thickness within the above-described range. The conductive pattern layer 50 may be annealed at a temperature within a proper range. Accordingly, a conductive pattern layer having a low resistance and high transmittance may be prepared to also prevent deterioration in the first protective layer.

More particularly, a step of forming a film may be executed by applying the conductive compound including indium tin oxide (ITO) to the first protective layer. The step may be performed by various thin film deposition techniques such as a physical vapor deposition (PVD), a chemical vapor deposition (CVD), or the like.

The deposition process may be executed under an $H_2O$ atmosphere or $O_2$ atmosphere. In consideration of the subsequent crystallinity, types of etchant in a pattern etching process, or the like, the deposition process may be preferably performed under the $H_2O$ atmosphere.

As describe above, after forming the film on the first protective layer by applying the conductive compound thereto, heat treatment may be performed thereon at about 200 to 300° C. for 10 to 40 minutes, thus to prepare the conductive pattern layer. Through the heat treatment process, the conductive compound may be crystallized so that indium tin oxide (ITO) may satisfy a desired range of low resistance and high transmittance.

If the heat treatment is performed at a temperature of less than 200° C., since the conductive compound is not sufficiently crystallized, it is difficult to obtain a conductive pattern layer having a low resistance and high transmittance. If the heat treatment is performed at a temperature exceeding 300° C., a deterioration in the lower first protective layer or separation layer may occur, thereby causing a deterioration in optical characteristics and an increase in a peel-off strength. In this regard, the temperature of the heat treatment may be preferably about 180 to 230° C.

If the heat treatment is performed for less than 10 minutes, since the conductive compound is not sufficiently crystallized, it is difficult to attain a conductive pattern layer having a low resistance and high transmittance. If the heat treatment is performed for more than 40 minutes, a deterioration in the lower first protective layer or separation layer may occur, thereby causing a deterioration in optical characteristics and an increase in a peel-off strength. In this regard, the time of the heat treatment is preferably about 15 to 35 minutes.

The heat treatment in the present invention may be executed before a step of forming a photoresist layer which will be described below, or may also be executed after an etching step which will be described below.

Then, in order to form desired patterns, the step of forming a photoresist layer on an upper surface of the conductive compound film may be executed.

A photosensitive resin composition for forming a photoresist layer is not particularly limited, and any photosensitive resin composition typically used in the related art may be used.

After applying the photosensitive resin composition to the conductive compound film, volatile components such a solvent are evaporated by heating and drying, thus providing a smooth photoresist layer.

The photoresist layer obtained as described above may be irradiated (exposed) using UV-rays through a mask for foiling desired patterns. In this case, in order to uniformly irradiate an entire exposed part with parallel light beams and correctly perform positioning between the mask and the substrate, a device such as a mask aligner or stepper may be used. When irradiating the film with UV-rays, the irradiated portion becomes cured.

The UV-rays as described above may include G-beam (wavelength: 436 nm), H-beam, I-beam (wavelength: 365 nm), or the like. An amount of UV-ray irradiation may be suitably selected as necessary.

The photoresist layer prepared after curing may be in contact with a developing solution to dissolve and develop an unexposed part, thereby foiling the desired patterns.

The development method used herein may include any one including liquid addition, dipping, spraying, or the like. Further, the substrate may be inclined at any angle during developing.

The developing solution may a water-soluble solution containing an alkaline compound and a surfactant, and may use any material generally used in the related art, without particular limitation thereof.

Then, in order to form conductive patterns comparable to the photoresist patterns, an etching process may be executed.

An etchant composition used in the etching process is not particularly limited, and any etchant composition generally used in the related may be used, and a hydrogen peroxide-based etchant composition may be preferably used.

Through the etching process, the conductive pattern layer of the desired patterns may be foiled.

Next, the inventive method may further include forming the second protective layer 60 on the capping layer 40 on which the conductive pattern layer 50 is formed.

The second protective layer 60 in itself may serve as the base film, and the passivation layer. In addition, the second protective layer 60 may prevent the conductive pattern layer 50 from being corroded, and suppress an occurrence of microbubbles when being attached to the base film 70, and may also serve as the adhesive layer.

The second protective layer 60 may be formed of the above-described polymer or the above-described adhesive or binder.

In addition, the inventive method may further include adhering the base film 70 on the second protective layer 60.

The base film 70 may be a film, polarizer, retardation film, or protective film formed of the above-described material, and may be a single film or a lamination film in which the above-described films are laminated in two layers or more.

The polarizer may be a type in which a polarizer protective film is attached to one surface or both surfaces of a polyvinyl alcohol polarizer.

When the second protective layer 60 serves as the base film or passivation layer, the base film 70 may be adhered on the second protective layer 60 through an adhesive agent.

The base film 70 may be adhered by applying a pressure, and a pressure range is not particularly limited, and may be, for example, 1 to 200 Kg/cm$^2$, and preferably, 10 to 100 Kg/cm$^2$.

When adhering the base film 70, in order to improve adhesion between the base film 70 and the second protective layer 60, a surface of the second protective layer 60 may be subjected to a surface treatment such as corona treatment, flame treatment, plasma processing, UV irradiating, primer application processing, saponification, or the like.

Next, the carrier substrate 10 is peeled-off from an upper laminate including the separation layer 20, the first protective layer 30, the capping layer 40 and the conductive pattern layer 50.

An order of the peeling-off process from the carrier substrate 10 is not particularly limited, but the process may be executed after forming the second protective layer 60. After an adhesive film having a higher adhesiveness than the adhesion between the separation layer 20 and the carrier substrate 10 may be adhered on the second protective layer 60, when executing the peeling-off process with the adhesive film being fixed, the upper laminate may be easily peeled-off from the carrier substrate 10. Thereafter, the adhesive film may be removed, and the base film 70 may be adhered on the second protective layer 60.

The separation layer 20 may not be removed after peeling-off, and remain in the film touch sensor so that the separation layer 20 may cover and protect the conductive pattern layer 50 together with the first protective layer 30.

The method for fabricating a film touch sensor according to an embodiment of the present invention may be executed by the same procedures as described in the above embodiment until the step of forming the conductive pattern layer. In addition, the process of peeling-off the separation layer 20 from the carrier substrate 10 may be executed by the same procedures as described in the above embodiment, and the process of adhering the base film 70 on the separation layer 20 may also be executed by the same procedures as described in the above embodiment except for adhering it to the separation layer 20 instead of the second protective layer 60 in the above-described embodiment.

Touch Panel and Image Display Device

Further, the present invention provides a touch panel including the above-described film touch sensor, and an image display device including the touch panel.

The touch panel of the present invention may be applicable to typical liquid crystal display devices, as well as various image display devices such as a touch screen, electro-luminescent display device, plasma display device, electro emission display device, or the like. In particular, the touch panel may be effectively applicable to an image display device having flexible characteristics.

Hereinafter, exemplary examples are proposed to more concretely describe the present invention. However, the following examples are only given for illustrating the present invention, and those skilled in the art will obviously understand that various alterations and modifications are possible within the scope and spirit of the present invention. Such alterations and modifications are duly included in the appended claims.

Example 1

A capping layer including SiOxNy ($0 \leq x \leq 4$, $y=4-x$) was formed on a polymer-based first protective layer, then an ITO layer having a thickness of 470 Å was formed thereon under an H$_2$O atmosphere, and heat treatment was performed at 230° C. for 20 minutes.

Example 2

The same procedures as described in Example 1 were conducted to form an ITO layer except that a capping layer including SiO$_x$ ($x=2$) was formed on the first protective layer.

Comparative Example

The same procedures as described in Example 1 were conducted to form an ITO layer except that the ITO layer was directly formed on the first protective layer without forming a capping layer including SiOxNy.

Experimental Example

1. Surface Resistance

Surface resistances of the ITO layers fabricated in the examples and comparative example were measured (a mean value of nine measurements), and the results thereof are listed in Table 1 below.

2. Visibility of Pattern

After the same touch patterns as each other were formed on the ITO layers fabricated in the examples and comparative example, second protective layers (passivation layers) and polarizers were adhered thereto by the same method as each other. Then, 100 test panels visually observed the ITO layers fabricated in the examples and comparative example to determine whether the touch patterns were viewed, and the number of the test panels determining to view the above patterns was counted and listed in Table 1 below.

◎: touch patterns were viewed by 5 panels or less
○: touch patterns were viewed by more than 5 panels but 10 panels or less
Δ: touch patterns were viewed by more than 10 panels but 50 panels or less
X: touch patterns were viewed by more than 50 panels

TABLE 1

|  | Example 1 | Example 2 | Comparative Example |
|---|---|---|---|
| Mean surface resistance ($\Omega/\square$) | 93.5 | 163 | 286 |
| Visibility | ◎ | ◎ | X |

Referring to Table 1, it can be confirmed that the film touch sensors fabricated in the examples having the capping layer according to present invention have a lower surface resistance and visual recognition of patterns than the comparative example. Also, it can be confirmed that effects of reducing the surface resistance of the film touch sensor fabricated in Example 1 having the capping layer including SiOxNy of silicon oxynitride were more excellent than the film touch sensor fabricated in Example 2 having the capping layer including SiOx of silicon oxide.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A film touch sensor comprising:
    a separation layer comprising a polymer organic film which is capable of being peeled-off from a carrier substrate;
    a first protective layer that is an organic insulation layer formed on the separation layer;
    a capping layer formed on an entire top surface of the first protective layer, the capping layer including $SiO_xN_y$, where $0 \leq x \leq 4$ and $y=4-x$, wherein the first protective layer that is the organic insulation layer is interposed between the separation layer and the capping layer;
    a conductive pattern layer formed directly on a top surface of the capping layer, the conductive pattern layer comprising touch sensing electrodes including a conductive metal oxide, the conductive pattern layer being physically and electrically separated from the first protective layer with the capping layer interposed therebetween; and
    a base film disposed on the conductive pattern layer or under the separation layer.

2. The film touch sensor of claim 1, wherein, in the $SiO_xN_y$, x and y have a relation of $0<x<4$ and $y=4-x$.

3. The film touch sensor of claim 1, wherein of the polymer organic film is formed of a polymer selected from the group consisting of polyimide-based polymer, polyvinyl alcohol-based polymer, polyamic acid-based polymer, polyamide-based polymer, polyethylene-based polymer, polystyrene-based polymer, polynorbornene-based polymer, phenyl maleimide copolymer, polyazobenzene-based polymer, polyphenylene phthalamide-based polymer, polyester-based polymer, polymethyl methacrylate-based polymer, coumarin-based polymer, phthalimidine-based polymer, chalcone-based polymer, and aromatic acetylene-based polymer.

4. The film touch sensor of claim 1, wherein the conductive pattern layer is formed of at least one material selected from the group consisting of a metal oxide, a metal, a metal nanowire, a carbon-based material, and a conductive polymer.

5. The film touch sensor of claim 1, wherein the conductive pattern layer is formed of indium tin oxide (ITO).

6. The film touch sensor of claim 1, wherein the conductive pattern layer has a thickness ranging from 100 to 500 Å.

7. The film touch sensor of claim 1, further comprising a second protective layer disposed on the capping layer on which the conductive pattern layer is formed.

8. The film touch sensor of claim 1, wherein the base film is a polarizer or a transparent film.

9. A touch panel comprising the film touch sensor of claim 1.

10. An image display device comprising the touch panel of claim 9.

11. A method for fabricating a film touch sensor, the method comprising:
    forming a separation layer comprising an organic polymer on a carrier substrate;
    forming a first protective layer comprising an organic insulation layer on the separation layer;
    forming a capping layer including $SiO_xN_y$, where $0 \leq x \leq 4$ and $y=4-x$, on an entire top surface of the first protective layer;
    forming a conductive pattern layer directly on a top surface of the capping layer, the conductive pattern layer including a conductive metal oxide; and
    peeling-off the carrier substrate from the separation layer,
    wherein the first protective layer is interposed between the separation layer and the capping layer so that the conductive pattern layer is physically and electrically separated from the first protective layer with the capping layer interposed therebetween.

12. The method of claim 11, further comprising adhering a base film to the conductive pattern layer.

13. The method of claim 11, further comprising adhering a base film to a surface of the separation layer from which the carrier substrate is peeled-off.

14. The method of claim 11, wherein, in the $SiO_xN_y$, x and y have a relation of $0<x<4$ and $y=4-x$.

15. The method of claim 11, wherein the capping layer is formed by a deposition method.

16. The method of claim 11, further comprising forming a second protective layer on the capping layer on which the conductive pattern layer is formed.

17. The method of claim 11, further comprising adhering a base film to the conductive pattern layer or the separation layer using an adhesive agent.

\* \* \* \* \*